(12) United States Patent
Prakken

(10) Patent No.: US 6,691,856 B1
(45) Date of Patent: Feb. 17, 2004

(54) CONVEYOR TRACK OF THE SMART-TRACK TYPE

(76) Inventor: Bouwe Prakken, Spijkerlaan 9, NL-3471 EG Kamerik (NL)

( * ) Notice: Subject to any disclaimer, the term of this patent is extended or adjusted under 35 U.S.C. 154(b) by 0 days.

(21) Appl. No.: 10/129,480

(22) PCT Filed: Nov. 6, 2000

(86) PCT No.: PCT/NL00/00806
§ 371 (c)(1),
(2), (4) Date: May 6, 2002

(87) PCT Pub. No.: WO01/32535
PCT Pub. Date: May 10, 2001

(30) Foreign Application Priority Data

Nov. 5, 1999 (NL) .............................................. 1013509

(51) Int. Cl.[7] .............................................. B65G 47/26
(52) U.S. Cl. ................................ 198/419.3; 198/465.3; 198/803.2
(58) Field of Search ..................... 198/419.2, 419.3, 198/465.3, 803.2

(56) References Cited

U.S. PATENT DOCUMENTS 4,180,154 A * 12/1979 Andersson ............... 198/419.3
5,706,633 A   1/1998 Moncrief et al.
5,884,749 A * 3/1999 Goodman ................ 198/419.3
6,260,689 B1 * 7/2001 Takemoto et al. ........ 198/484.1

FOREIGN PATENT DOCUMENTS

| EP | 0 060 720 | 9/1992 |
| EP | 0 512 644 A1 | 11/1992 |
| EP | 0 748 751 A1 | 12/1996 |
| FR | 1.393.472 | 7/1965 |

* cited by examiner

Primary Examiner—Joseph A. Dillon
(74) Attorney, Agent, or Firm—Young & Thompson

(57) ABSTRACT

A conveyor track of the smart-track type, comprises two conveyors, each consisting of at least one endless, flexible conveyor member, such as a chain, each conveyor having a separate drive and elements for switching the drives on and off and controlling the conveying speed of the conveyor members, and at least one section provided with drivers being attached to each of the conveyors by elements attachment members. The elements (21) for removably mounting a section (16; 17) provided with drivers (15) on an attachment member (20) of a conveyor (1a, 1b; 2a, 2b) are designed in such a manner that the distance from these elements (21) to two flexible conveyor members (1a, 1b; 2a, 2b) situated next to and at a short distance from one another is substantially identical.

16 Claims, 3 Drawing Sheets

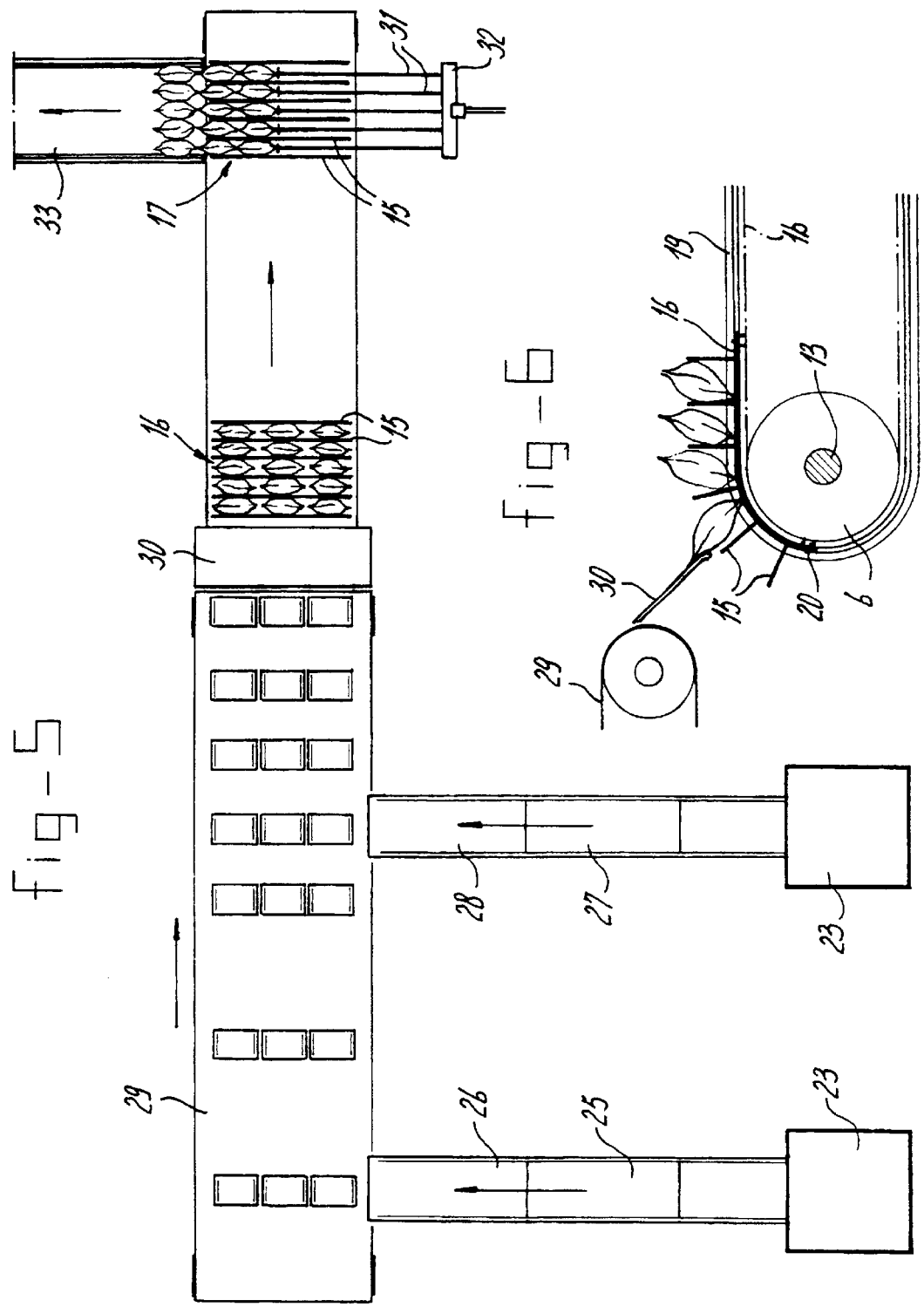

CONVEYOR TRACK OF THE SMART-TRACK TYPE

BACKGROUND OF THE INVENTION

The invention relates to a conveyor track of the smart-track type, comprising two conveyors, each consisting of at least one endless, flexible conveyor member, such as a chain, each conveyor having a separate drive and means for switching the drives on and off and controlling the conveying speed of the conveyor members, and at least one section provided with drivers being attached to each of the conveyors by means of attachment members. A machine of this type is disclosed in EP-A-0748751.

DESCRIPTION OF THE RELATED ART

Such a machine can be used to group in a row a defined number of small bags filled with crisps or the like and then to package these small bags with the aid of a so-called mould-fill seal machine. In a machine of this type, a sheet of film is moulded into a bag which is stretched around a number of smaller bags. While a row of small bags which have been grouped together are being packaged in a film to form a filled bag, another row of small bags is grouped together.

Known designs of this conveyor track have the drawback of only being suitable for sections which are provided with a defined number of drivers. To transfer to sections with a different number of drivers and/or with a different distance between the drivers, it is necessary to exchange the chains.

SUMMARY OF THE INVENTION

The object of the invention is to design the conveyor track described in the preamble in such a way that the sections provided with drivers can be replaced quickly without having to exchange the flexible members.

To this end, according to the invention the conveyor track is characterized in that the means for removably mounting sections which are provided with drivers on an attachment member of a flexible conveyor member are designed in such a manner that the distance from these means to the two flexible conveyor members positioned next to one another is substantially identical.

In an advantageous embodiment, the attachment members comprise L-shaped profiles.

The conveyor track preferably comprises two parallel pairs of flexible members.

To provide good guidance for the sections provided with drivers, a free edge extends on either side of the drivers, extending into a U-shaped guide profile which is arranged fixedly on the frame of the conveyor track.

Replacement of the sections provided with drivers can be simplified further if the guide profile has an insertion and removal part which is intended to guide a section provided with drivers into an attachment position inside the conveyor track or out of the conveyor track.

BRIEF DESCRIPTION OF THE DRAWINGS

The invention will now be explained in more detail with reference to the figures, which show an exemplary embodiment.

FIG. 5 diagrammatically depicts a plan view of a device for guiding more than six filled small bags to a fill-mould-seal machine.

FIG. 6 shows a diagrammatic side view of a part of the device shown in FIG. 5.

DESCRIPTION OF THE PREFERRED EMBODIMENTS

Figure 1:
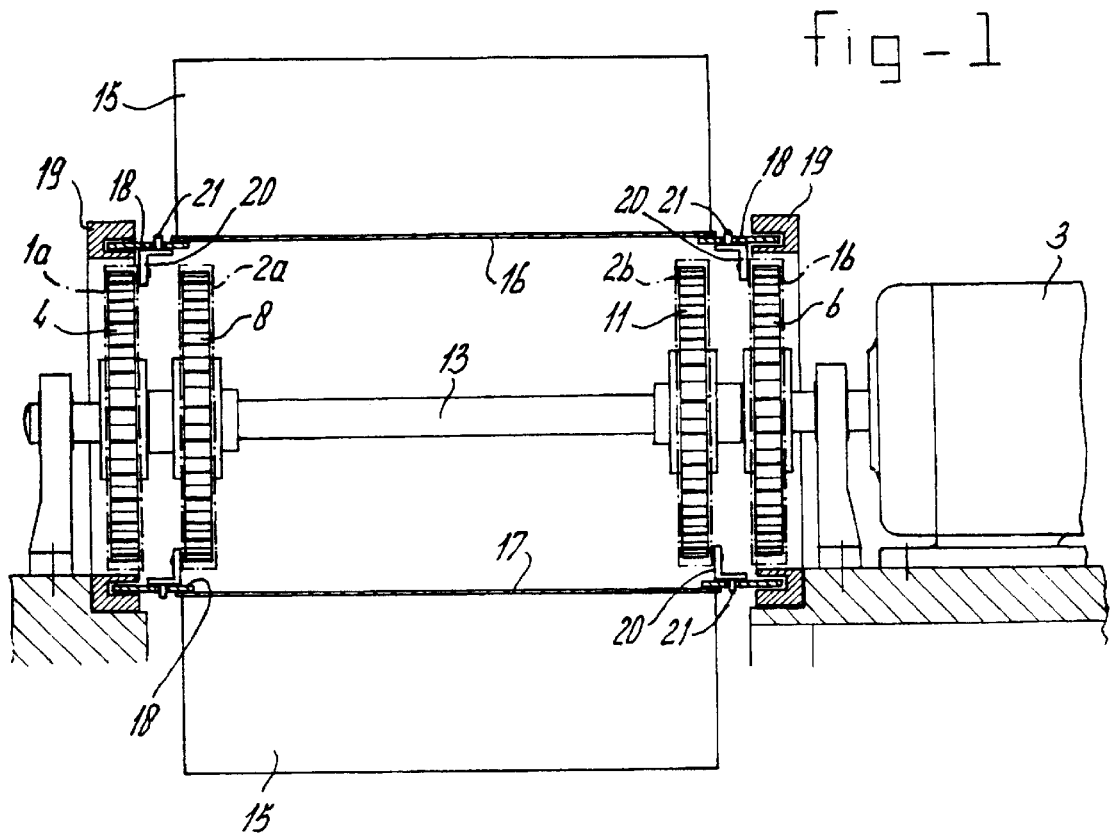
FIG. 1 shows a cross section through the conveyor track of the smart-track type according to the invention.
Figure 2:
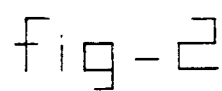
FIG. 2 shows a plan view of this conveyor track.
Figure 2:
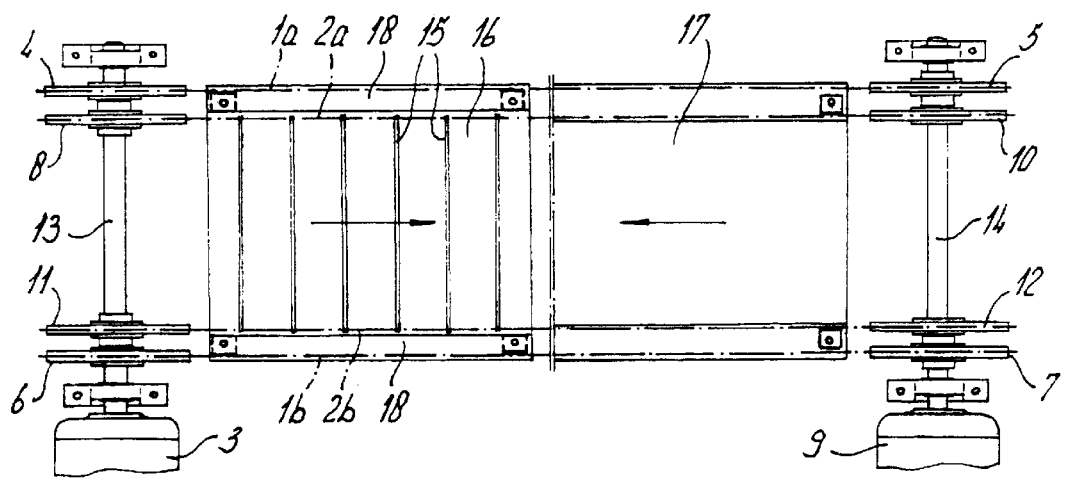

The conveyor track illustrated has four endless chains which form two chain conveyors 1a, 1b and 2a, 2b. The chain 1a of one conveyor is at a short distance from the chain 2a of the other conveyor, and the chain 1b of one conveyor is at a short distance from the chain 2b of the other conveyor. As an alternative to chains, it is also possible to use other flexible members. The distance between the chains 1a and 1b of one conveyor is greater than the distance between the chains 2a and 2b of the other conveyor. The chain 1a runs over a sprocket 4 which is driven by a motor 3 and a sprocket 5 which is not driven. The chain 1b runs over a sprocket 6 which is driven by the motor 3 and a sprocket 7 which is not driven. The chain 2a runs over a sprocket 8 which is not driven and a sprocket 10 which is driven by the motor 9, and the chain 2b runs over a sprocket 11 which is not driven and a sprocket 12 which is driven by the motor 9. On both motors 3 and 9, there are means (not shown, preferably computer-controlled) which can switch the said conveyors on and off automatically and are able to control the speed of the conveyors.

The axles of the sprockets 8 and 11 are mounted so as to run freely on the common driven axle 13 of the sprockets 4 and 6, while the axles of the sprockets 5 and 7 are mounted so as to run freely on the common driven axle 14 of the sprockets 10 and 12.

Figure 3:
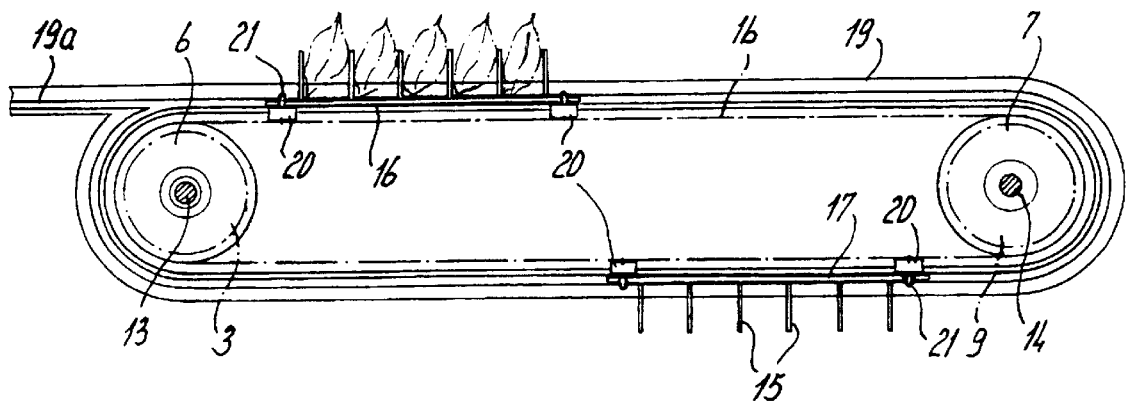
FIG. 3 shows a longitudinal section.
Figure 4:
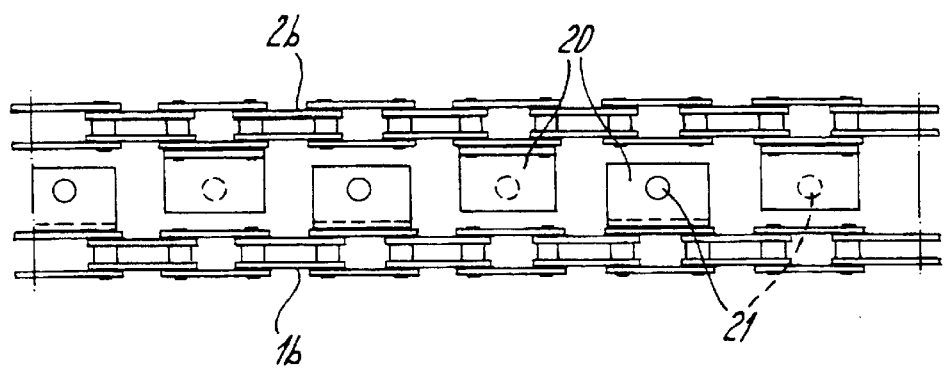
FIG. 4 shows a plan view of two chains arranged next to one another, each belonging to a different chain conveyor.

A section provided with drivers 15 is removably attached to each of the chain conveyors 1a, 1b and 2a, 2b. In FIGS. 1 and 3, the section attached to the conveyor 1a, 1b is denoted by 16 and the section attached to the conveyor 2a, 2b is denoted by 17.

On either side of the drivers 15, the sections 16 and 17 have a projecting edge 18 which fits into a horizontal U profile 19, which serves as a guide. There are therefore two U profiles. L-shaped attachment members 20 are fixed to certain chain links of the chains. A pin 21 is arranged on that flange of these attachment members which faces away from the corresponding chain. The attachment members 20 of the chains 1a and 1b are arranged on the inside of the chains, and the flange of these attachment members which is provided with a pin extends inwards. The attachment members 20 of the chains 2a, 2b are arranged on the outside of these chains and the flange of the relevant attachment members which is provided with a pin 21 extends outwards. The dimensions of the L-shaped attachment members 20 with respect to the distance between the adjacent chain parts of the chains 1a and 2a and of the chains 1b and 2b is selected in such a way that the pins 21 extend in the centre plane between the said chains 1a, 2a and 1b, 2b.

In the projecting side edges 18 of the sections 16 and 17 provided with drivers there are holes through which the pins 21 can be fitted. The distance between the holes in the side edges of the section 16 is equal to that between the holes in the side edges of section 17. Moreover, this distance corresponds to the distance between a pair of pins 21 of the L-shaped attachment members 20 of the chains 1a and 1b and to the distance between a pair of pins 21 of the L-shaped attachment members 20 of the chains 2a and 2b, meaning that, although the distance between the chains 2a and 2b is shorter than the distance between the chains 1a and 1b, the distances between opposite holes in the side edges 18 of the sections 16 and 17 are equal to one another. The sections 16 and 17 fit both onto the conveyor 1a, 1b and onto the conveyor 2a, 2b.

In the vicinity of one of the pairs of sprockets, the U-shaped guides 19 have a part 19a (FIG. 3) which can be used to replace the sections 16 and 17 with sections having a different number of drivers and/or a different distance between the drivers.

The pins 21 may, for example, comprise parts which are resilient with respect to one another. Moreover, the possibility of pin 21 being arranged on the projecting parts 18 of the sections and the holes through which these pins are to be fitted being arranged in the L-shaped attachment members 20 is not ruled out.

The chains 1a, 1b and 2a, 2b may easily be provided with any sections provided with members which are in stock. These sections are then equivalent to one another.

The diagrammatic plan view shown in FIG. 5 and the side view shown in FIG. 6 illustrate how the machine described above can be used.

FIG. 5 shows two hoppers 23 and 24 for vertically supplying small bags, for example, in the case of hopper 23, the small bags are filled with plain crisps, and in the case of hopper 24 the small bags are filled with paprika-flavoured crisps.

Beneath the hoppers are two conveyor units 25, 26 and 27, 28, which place the small bags which have been supplied via the hoppers at substantially equal distances from one another. By means of a robot (not shown), the small bags are placed onto a conveyor belt 29 in rows of three and are conveyed, in the direction of the arrow, towards a slide-way 30 which deposits the rows of small bags successively into spaces between the drivers 15, which are moved in steps, of the section 16 of the conveyor 1a, 1b. In the meantime, the section 17 on the chain conveyor 2a, 2b has quickly moved into the position shown in FIGS. 5 and 6, in which the spaces between the drivers 15 are situated opposite the pusher members 31 of a pusher device 32 which is operated by a hydraulic or pneumatic cylinder or is driven by an electric motor. As a result of this cylinder being actuated, the rows of small bags are pushed onto the conveyor 33 and are guided by side guides in the direction of the vertical arrow towards a mould-fill-seal machine which is not shown but is known per se, where the set of small bags are tightly enclosed in a regular arrangement by film which is moulded into a sealed bag. In this way, it is possible to package more than six small bags, in such a manner that the result is a taut bag which has been filled in an orderly way.

Numerous variants and additional measures are conceivable within the scope of the main claims.

What is claimed is:

1. Conveyor track, comprising:
   two conveyors, each conveyor comprising two spaced-apart endless, flexible conveyor members,
   each conveyor having a separate drive and means for switching the drives on and off and controlling the conveying speed of the conveyor members,
   at least one section for supporting items being conveyed, the section provided with drivers which separated the conveyed items from each other on said at least one section,
   the section removably mounted to each of the conveyors by attachment members,
   the attachment members for removably mounting the section being positioned equi-distant from and intermediate to two adjacent flexible conveyor members.

2. Conveyor member according to claim 1, wherein the attachment members have a projecting part to mount the section by fitting through an opening arranged in the section.

3. Conveyor track according to claim 1, wherein the attachment members comprise L-shaped profiles.

4. Conveyor track according to claim 3, wherein the L-shaped profiles are attached to the two adjacent flexible members, alternating ones of the L-shaped profiles attached to an exterior one of the two adjacent flexible members, and further alternating ones of the L-shaped profiles attached to an interior one of the two adjacent flexible members.

5. Conveyor track according to claim 4, wherein on both sides of the section, a free edge projects on either side of the drivers, this free edge extending into a U-shaped guide profile which is arranged fixedly on a frame of the conveyor track.

6. Conveyor track according to claim 5, wherein the guide profile has an insertion and a removal part intended to guide the section into an attachment position inside the conveyor track or out of the conveyor track.

7. Conveyor track, comprising:
   a first conveyor and a second conveyor, each of the first and second conveyors comprising two spaced-apart endless, flexible conveyor members,
   the two conveyor members of the first conveyor being located interior to the two conveyor members of the second conveyor;
   each conveyor having a separate drive;
   at least one section for supporting items being conveyed, the section provided with drivers for separating the conveyed items; and
   attachment members, some of the attachment members mounted to each of the two conveyors members of the first conveyor and others of the attachment members mounted to each of the two conveyors members of the second conveyor,
   the attachment members including elements for removably mounting and supporting the section,
   the attachment members being positioned equi-distant from and intermediate to two adjacent conveyor members so that consecutive ones of the elements for removably mounting and supporting the section are in straight-line alignment between the two adjacent conveyor members.

8. The conveyor track of claim 7, wherein,
   the conveyors members are chains,
   the elements are projecting pins engagable into openings arranged along edges of the section.

9. The conveyor track of claim 8, wherein the attachment members further comprise L-shaped profiles.

10. The conveyor track of claim 9, wherein alternating ones of the L-shaped profiles are attached to an exterior one of the two adjacent flexible members, and further alternating ones of the L-shaped profiles are attached to an interior one of the two adjacent flexible members.

11. The conveyor track of claim 10, wherein on sides of the section, a free edge projects exterior to the drivers, the free edge extending into a U-shaped guide profile arranged fixedly on a frame of the conveyor track.

12. The conveyor track of claim 11, wherein the guide profile has an insertion and a removal part intended to guide the section into an attachment position inside the conveyor track or out of the conveyor track.

13. A conveyor track, comprising:

four endless chains which form two chain conveyors, a distance between a pair of chains of a first conveyor being greater than a distance between a pair of chains of a second conveyor, the first conveyor being located exterior to the second conveyor;

the chains run over sprockets driven by two motors, a first motor drives sprockets running the chains of the first conveyor and the second motor drives sprockets running the chains of the second conveyor, four of the sprockets are not driven and are support on axles mounted so as to run freely on driven axles of other sprockets;

a section for conveying items is removably mountably to either of the first and second conveyors;

drivers attached to the section separate the conveyed items; and mounting elements attached to the chains provide mounting support for removably mounting the section to either of the first and second conveyors, the mounting elements being fixed to an interior edge of the chains of the first conveyor and to an exterior edge of the chains of the second conveyor, mounting elements located between adjacent chains being in common alignment.

14. The conveyor track of claim 13, further comprising:

the section having, exterior to the drivers, a projecting edge;

a horizontal U profile guide engaging the projecting edge.

15. The conveyor track of claim 13, wherein, the mounting elements include L-shaped attachment members fixed to chain links of the chains; and pins arranged on a flange of the attachment members fit through holes located along a projecting edge of the section to provide for removably mounting the section onto the flange.

16. The conveyor track of claim 15, wherein the pins located between adjacent chains form a single straight line.

* * * * *